(12) United States Patent
Kondziella et al.

(10) Patent No.: US 10,443,773 B2
(45) Date of Patent: Oct. 15, 2019

(54) PUSH-IN CONNECTOR

(71) Applicant: A. KAYSER AUTOMOTIVE SYSTEMS GmbH, Einbeck (DE)

(72) Inventors: Klaus Kondziella, Einbeck (DE); Heiko Freter, Einbeck (DE); Gerald Bauerfeind, Trendelburg (DE); Klaus Mösges, Holzminden (DE)

(73) Assignee: A. KAYSER AUTOMOTIVE SYSTEMS GmbH, Einbeck (DE)

( * ) Notice: Subject to any disclaimer, the term of this patent is extended or adjusted under 35 U.S.C. 154(b) by 221 days.

(21) Appl. No.: 15/428,651

(22) Filed: Feb. 9, 2017

(65) Prior Publication Data
US 2017/0234469 A1 Aug. 17, 2017

(30) Foreign Application Priority Data
Feb. 12, 2016 (DE) .................. 10 2016 001 610

(51) Int. Cl.
*F16L 37/098* (2006.01)
*F16L 37/26* (2006.01)

(52) U.S. Cl.
CPC .......... *F16L 37/0985* (2013.01); *F16L 37/26* (2013.01)

(58) Field of Classification Search
CPC .............................. F16L 37/0985; F16L 37/26
USPC ....................................................... 285/305
See application file for complete search history.

(56) References Cited

U.S. PATENT DOCUMENTS

| 5,586,791 A | * | 12/1996 | Kirchner | ............. | F16L 37/0985 |
| | | | | | 285/179 |
| 5,947,531 A | * | 9/1999 | Eckard | ................ | F16L 37/1205 |
| | | | | | 285/319 |
| 6,318,764 B1 | * | 11/2001 | Trede | .................. | F16L 37/0841 |
| | | | | | 285/305 |

(Continued)

FOREIGN PATENT DOCUMENTS

| DE | 19722842 A1 | 12/1998 | |
| DE | 19832377 C2 | * 10/2001 | .......... F16L 37/0985 |

(Continued)

*Primary Examiner* — David Bochna
(74) *Attorney, Agent, or Firm* — Fox Rothschild LLP

(57) ABSTRACT

A push-in connector for releasably connecting the ends of two media lines consists of a push-in part (2) and a socket part (1) composed of a first socket section (3) and a second socket section (5). In the installed condition, the push-in part (2) is axially latched in the second socket section (5) and accommodated in a manner that is rotatable about its axis, whereas the second socket section (5) can be accommodated in the first socket section (3) at different rotational angles about the common axis (18) in an axially latched manner. The second socket section (5) carries an actuation element (7) that is movable between a latched position shown by an axial pull-out safety device of the push-in part (2) and an unlatched position in which this pull-out safety device is lifted. This embodiment means that the rotational angular position of the second socket section (5) carrying the actuation element (7) with respect to the push-in part (2) as well as to the first socket section (3), and thus the actuation position of the push-in connector, can be adapted to the respective installation conditions, such that unencumbered access to the actuation element (7) is obtained.

19 Claims, 5 Drawing Sheets

(56) References Cited

U.S. PATENT DOCUMENTS

| | | | |
|---|---|---|---|
| 6,595,556 B1 * | 7/2003 | Zenko | F16L 37/008 285/140.1 |
| 6,637,780 B2 * | 10/2003 | Miyajima | F16L 37/0985 285/305 |
| 6,709,026 B2 * | 3/2004 | Sausner | F16L 37/144 285/305 |
| 7,316,425 B2 | 1/2008 | Poder | |
| 7,401,820 B2 * | 7/2008 | Niki | F16L 37/088 285/305 |
| 7,469,880 B2 * | 12/2008 | Green | F16L 37/091 251/148 |
| 7,497,480 B2 * | 3/2009 | Kerin | F16L 37/088 285/305 |
| 7,552,948 B2 * | 6/2009 | Matsuno | F16L 37/0985 285/308 |
| 8,240,717 B2 | 8/2012 | Freter | |
| 9,777,876 B2 * | 10/2017 | Kaneko | F16L 37/088 |
| 10,107,433 B2 * | 10/2018 | Eckard | B60K 15/01 |
| 2017/0299100 A1 * | 10/2017 | Leffler | F16L 37/26 |

FOREIGN PATENT DOCUMENTS

| | | | | |
|---|---|---|---|---|
| DE | 102009050076 B3 | 4/2011 | | |
| EP | 1405002 A1 | 4/2004 | | |
| WO | WO-2018019422 A1 * | 2/2018 | | F16L 37/0982 |

* cited by examiner

PUSH-IN CONNECTOR

RELATED APPLICATIONS AND CLAIM OF PRIORITY

This patent document claims priority to German Patent Application No. 10 2016 001 610.8, filed Feb. 12, 2016. The disclosure of the priority application is fully incorporated into this document by reference.

BACKGROUND

The present disclosure relates to a push-in connector for releasably connecting two line ends. Push-in connectors of this type are used in automobile construction in order to connect the ends of media lines, vacuum lines etc., and consist of a tubular push-in part for connection to the end of the line and a socket-like receiving part for connection to the other end of the line.

A push-in connector of this type is known from the document DE 10 009050 076 B3, wherein a circumferential retaining rib is formed on its push-in part, the rib engaging with a locking element when the push-in part has been pushed in; the locking element forms a pull-out safety device that acts axially. The locking element along with an actuating element form a portion of a circumferentially extending radially movable housing tab for the purposes of defining a latched position in which the locking element engages behind the retaining rib and an open position in which the locking element is not engaged with the retaining rib, which is also connected with the receiving part. The actuating element is axially supported between two housing ribs beyond which it does not protrude, so that accidental actuation of the actuating element is impossible. Actuation of the actuating element occurs in the peripheral direction with respect to the receiving part.

A further comparable push-in connector is known from the document EP 1405 002 B1; here again, a push-in part is provided with a circumferential retaining rib that is operatively connected with a locking element that is radially movable within the receiving part between a latched position in which the retaining rib and a locking element are engaged and an unlatched position in which the engagement is released. A position indicator is also connected to the locking element and protrudes out of the receiving part; its position shows that the push-in connector is in the correctly latched condition. However, a tool is required to release it from the latched condition by means of the position indicator.

A feature of this known push-in connector is that any actuation means for bringing about a latched condition or even an unlatched condition is located at a specific placement on the circumference of the receiving part. The actuation position which is fixed by this placement makes any assembly and/or dismantling activities more difficult when, because of the nature of the automobile, the push-in connector has to be installed in a position that is impossible to access or difficult to access.

DE 197 22 842 A1 discloses a push-in connector which consists of a push-in part and a socket part, wherein the socket part consists of two socket parts that can be pushed into one another at any rotational angle and interlocked axially. This means that a rotational angle for an actuation element for releasing an axially acting latched condition between the socket part and the push-in part can be selected in a manner such that, because of the nature of the automobile, easy access to the actuation element for assembly and dismantling is obtained.

SUMMARY

The object of the invention is to propose a push-in connector of the type defined that, by means of simple construction, can ensure that the actuation means can be installed under the prevailing installation conditions with access that is as unencumbered as possible. This object is accomplished by means of a push-in connector of this type having the features in accordance with aspects of the disclosure.

The socket part consists of two parts that are connected together, for example by pushing one into the other, the underlying principle being that they can be set at different rotational angles with respect to a common axis, the portions being a first socket section and a second socket section which can be interlocked axially into the first socket section. The second socket section carries the actuation element and in the connected state of the push-in connector, its point of placement is of substantial importance to the accessibility to the actuation element, for example for the purposes of releasing it from the latched position. Because the second socket section can be disposed at different angles with respect to the push-in part and the first socket section about their common axis, this ensures that the actuation position of the push-in connector can always be adjusted with a view to optimum accessibility of the actuation element so that it can be adapted to difficult installation situations.

An anti-rotation lock is provided between the socket sections. In this regard, the interlock of the socket sections can be oriented at different rotational angles so that every time, an installation position can be obtained that reflects the requirement for good accessibility to the actuation element.

The construction of the anti-rotation lock may, for example, be such that a mechanical engagement of ribs on one part and grooves on the other part occurs. In this manner, a play-free anti-rotation lock is obtained. Many embodiments may be envisaged in this regard, starting from just one rib on one part that engages with a groove of an arrangement of grooves on the other part, up to a plurality of ribs.

Because the pressure pulsates due to vibrations acting on the push-in connector from outside, then particularly as regards fuel lines, without an anti-rotation lock, unwanted rotation of the socket sections with respect to each other may occur, meaning that there is no longer free access to the actuation element. On the other hand, with an anti-rotation lock at this location on the push-in connector in accordance with the invention, a favorable position of the actuation element is ensured for the purposes of assembly and dismantling even under operational conditions.

According to some aspects, the two socket sections are rotatably disposed about their common axis in order to optimize the adaptability to different installation situations.

According to some aspects, the locking member is radially movable between the latched position and the unlatched position. In general as regards the constructive representation of this movement, any current technique known to the person skilled in the art may be employed in this instance.

In some aspects, in connection with the movement of the locking member between the push-in part and the second socket section, a latched position can be set at any rotational angle with respect to the axis of said socket section.

According to some aspects, in the installed condition, the push-in part extends through the second socket section into the first socket section. In this manner, the second socket section can be guided in a stable manner. The said sealing element is disposed in a manner such that it forms a seal of the media-carrying interior against the second socket section. The sealing element may be held in position in recesses formed in the opposing walls of the first socket section and the push-in part.

Some aspects of the disclosure provide the advantage that the actuation element and the locking member are formed as one piece with a tab via which a connection is made with the second socket section. This component-related construction means that the construction is more compact because a component is formed with the second socket section so that it can be handled as one piece.

A window in a lateral wall of the second socket section in accordance with aspects of the disclosure, and in fact axially in the vicinity of the locking member, provides a simple means for providing a visual check of correct latching.

It will be understood from the present remarks that a component is provided with the push-in connector in accordance with the invention wherein, because the rotational angle of the second socket part carrying the actuation element with respect to the push-in part can be selected in any manner, its actuation position can be adjusted to the installation situation in question, and in fact with the aim of accessibility to the actuation element that is as unencumbered as possible.

BRIEF DESCRIPTION OF THE DRAWINGS

The invention will be described in more detail below with reference to the accompanying drawings, in which.

DETAILED DESCRIPTION

Figure 1:
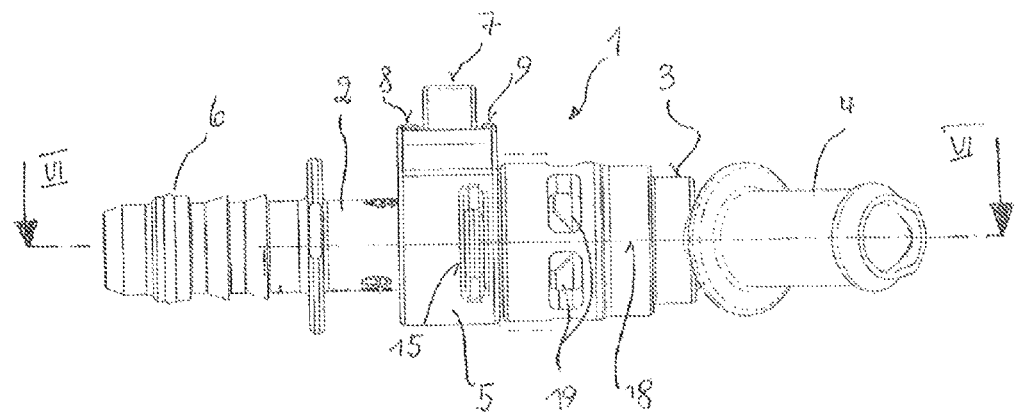
FIG. 1 is a side view of a push-in connector in accordance with the invention.
Figure 2:
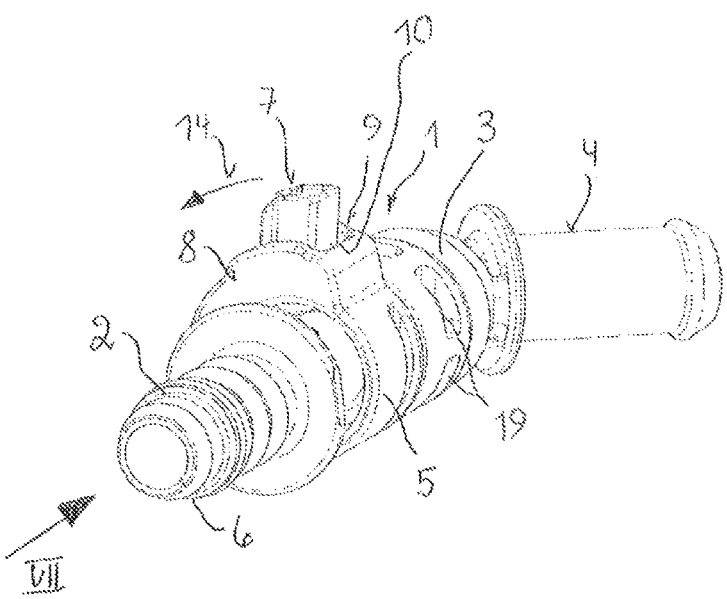
FIG. 2 is a perspective view of a push-in connector in accordance with the invention.
Figure 3:
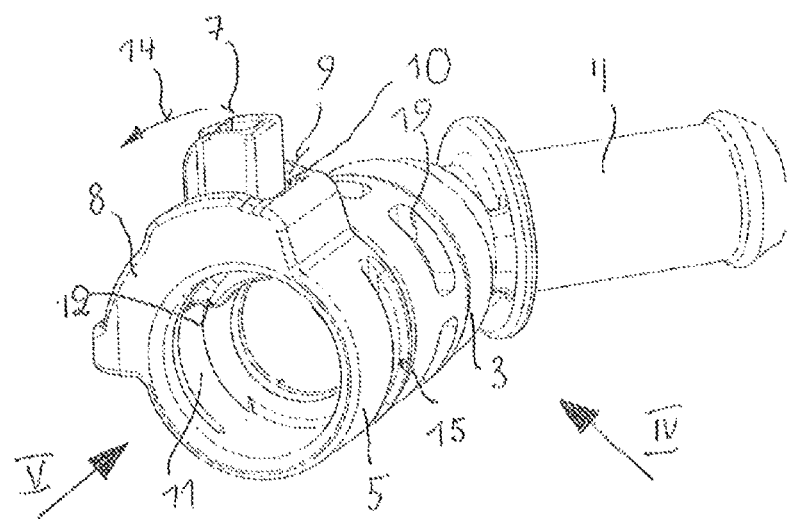
FIG. 3 is a perspective view of the socket part in accordance with the invention.
Figure 4:
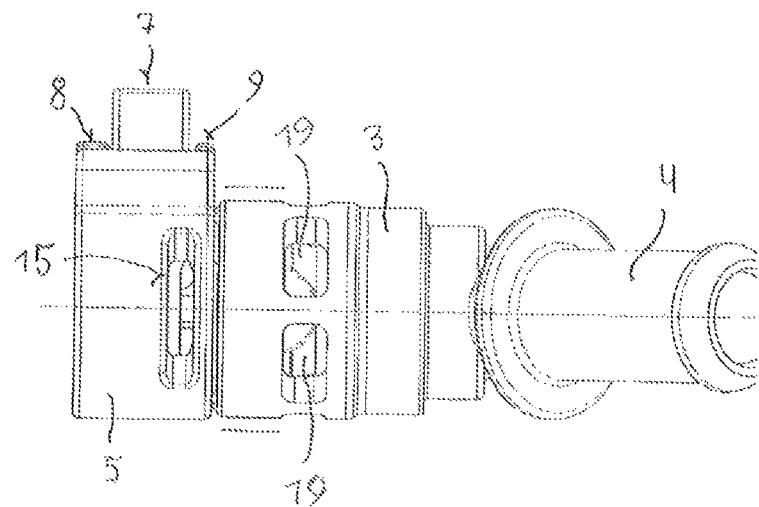
FIG. 4 is a planar view of the socket viewed in the direction IV of FIG. 3.
Figure 5:
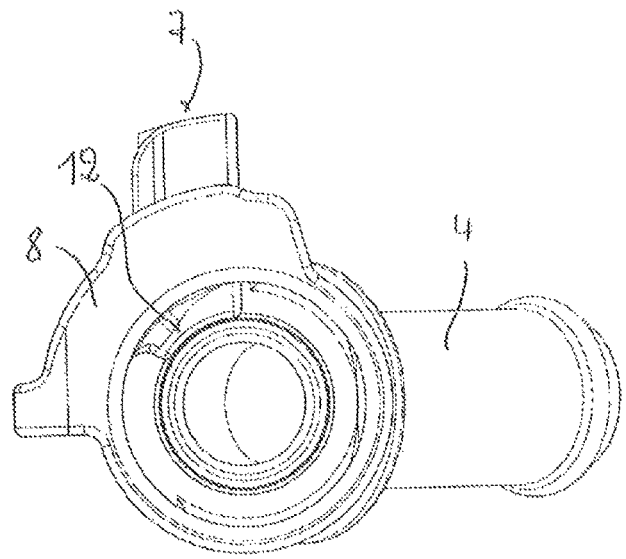
FIG. 5 is a front planar view of the socket part viewed from the direction V of FIG. 3.
Figure 6:
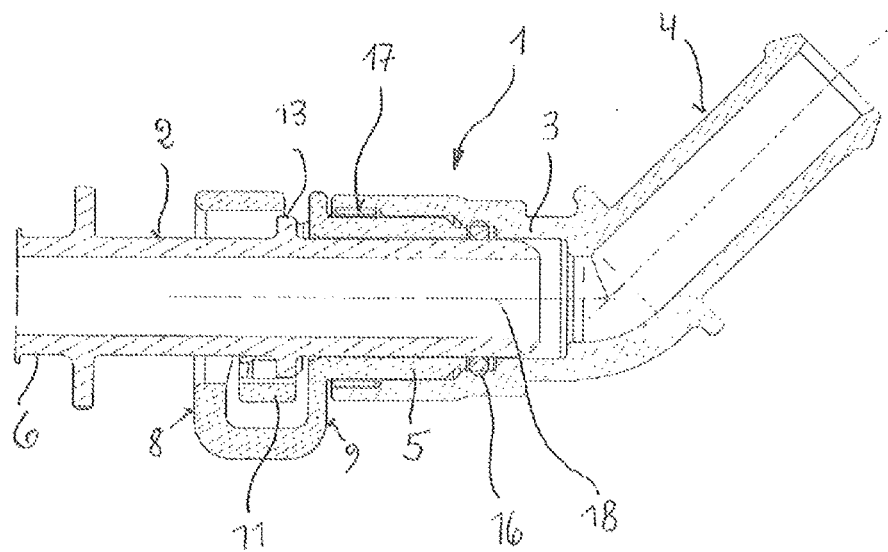
FIG. 6 is a partial sectional representation of the push-in connector in the plane VI-VI of FIG. 1.
Figure 7:
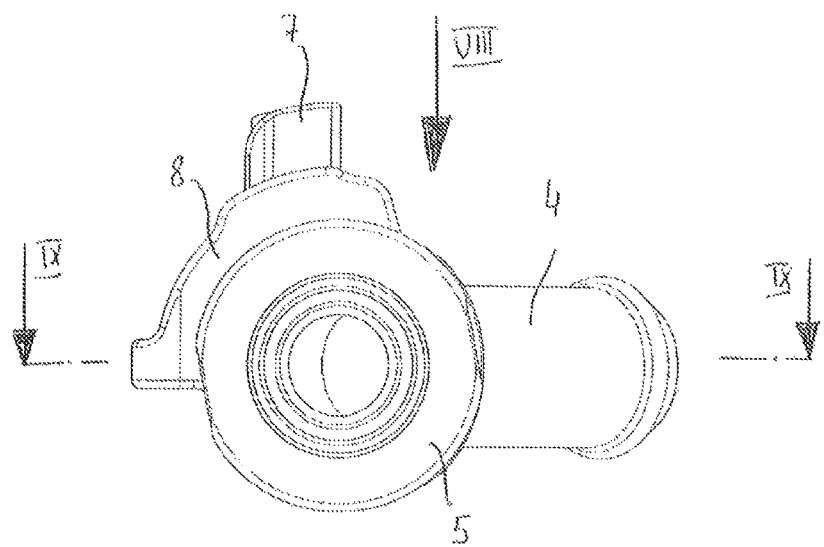
FIG. 7 is a planar view of the push-in connector viewed from the direction VII in FIG. 2.
Figure 8:
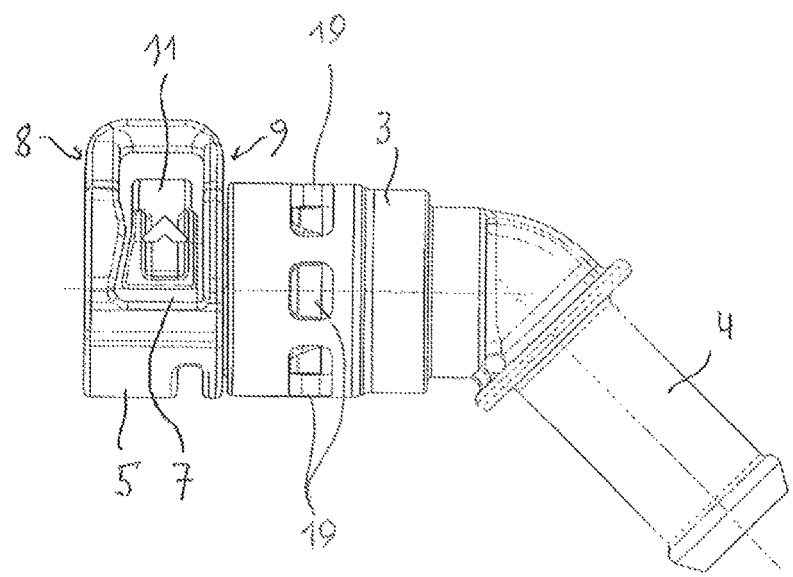
FIG. 8 is a planar view of the push-in connector viewed from the direction VIII of FIG. 7.
Figure 9:
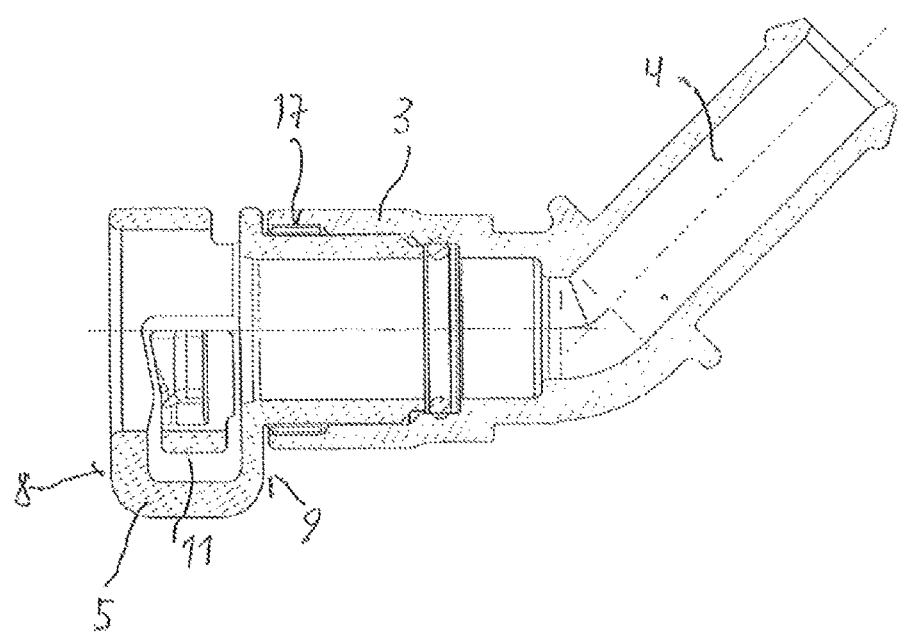
FIG. 9 is a sectional view of the push-in connector in a plane IX-IX of FIG. 7.

FIGS. 1, 2 and 6 show a socket part 1 and a push-in part 2 with their free ends respectively equipped for subsequent connection with sections of lines, not shown in the drawings. The push-in connector that is generally defined in this manner is primarily but not exclusively for connecting the ends of media lines of any type in automotive vehicles.

The socket part 1 consists of a first socket section 3 with a connector 4 for a proximate line section attached directly thereto in which a second socket section 5 is inserted via the end opposite to the connector 4 and which has been axially interlocked in its installation position. This interlock may be constructed in any routine manner known to the person skilled in the art, and so there is no need for further details to be provided in this regard. The essential point is that the rotational angle with respect to the common axis 18 of the socket section 5 with respect to the socket section 3 in the installed position can be selected.

The numeral 6 denotes the connector formed on the push-in part 2, the connector being positioned at the free end opposite to the connector 4 and intended for a proximate line section. The connection technology used with the connectors 4, 6 may in principle be of any type.

FIGS. 3 to 5 and 7 to 9 denote functional elements with the same numerals as those in FIGS. 1, 2 and 6, and so it is not necessary at this juncture to repeat the description pertaining thereto.

The numeral 7 denotes an actuation element, which protrudes radially from a recess 10 in the socket section 5 delimited by axially separated ribs 8, 9 formed thereon. The basic body of the actuation element 7 is formed by a tab 11 that extends in the circumferential direction of the socket part 5; the end of the tab is connected to the socket part 5.

Said basic body also carries a locking member 12 formed as an annular section that extends perpendicular to the axis 18, which, in the assembled state of the push-in connector, engages behind an annular locking rib 13 formed on the outside of the push-in part 2, forming an axial pull-out safety device in this manner.

The actuation element 7 can be elastically deflected manually in the direction of the arrow 14, whereupon the locking member 12, starting from a latched position engaging behind the locking rib 13, can be radially deflected into an unlatched position that releases the locking rib 13. A resilience that returns the locking member 12 to its starting position, namely the latched position, is provided by the elastic deflection of the tab 11.

The numeral 17 denotes an arrangement consisting of ribs that extend parallel to the axis and are disposed in a regular manner around the circumference and that are formed on the socket section 5, the ribs protruding into grooves on the interior of the socket section 3 and thus locking the relative rotational angle of these two sections.

The numeral 19 denotes latch windows of the socket section 3 through which, depending on their number, a separation of the push-in part of the socket sections 3, 5 in a circumferential direction can be seen, wherein any rotational play in the push-in part is removed by interlocking of the ribs 17.

In this manner, the socket section 5 can be inserted into the push-in part at different angles with respect to the socket section 3, wherein, however, a latched condition of the push-in part 2 in the inserted position can be obtained at any rotational angular position of these two parts. In this manner, it is therefore possible to adjust the rotational angle of the socket section 5 with respect to the push-in part 2 as well as the socket section 3 such that, as a function of the respective installation situation, unencumbered access to the actuation element 7 is obtained for the purposes of assembly and dismantling.

The numeral 15 denotes a window in the socket section 5 that enables a visible check of correct latching of the socket section 5 and the push-in part 2 to be carried out.

The numeral 16 denotes a sealing element acting between the socket section 3 and the push-in part 2.

LIST OF REFERENCE NUMERALS 1. socket part
2. push-in part
3. socket section
4. connector 5. socket section
6. connector
7. actuation element
8. web
9. web
10. recess
11. tab
12. locking member
13. locking rib
14. arrow
15. window
16. sealing element
17. ribs
18. axis
19. latch window

The invention claimed is:

1. A push-in connector for releasably connecting two media line ends, comprising:
   a socket part having a first socket section and a second socket section such that said second socket section is configured to be insertable axially into said first socket section, said first socket section having a first connector formed on a free end of said socket part which is connectable to a first media line, said socket part having a locking member and said second socket section of said socket part having an actuation element operable for moving said locking member;
   a push-in part having a first connector formed on a free end thereof capable of being connected to a second media line and further having a facing end opposite of said free end, said facing end of said push-in part being receivable in said second socket section of said socket part, said push-in part further having a circumferential locking rib;
   wherein the locking member is movable between a latched position engaging behind the locking rib to lock the push-in part to said second socket section axially and a retracted unlatched position that releases the locking rib to allow axial movement of the push in part relative to said second socket section, wherein when in the latched position, the push-in part is capable of being rotatable about its axis within the second socket section; and
   wherein said second socket section has an exterior that includes an arrangement of ribs thereon, and said first socket section has an interior that includes an arrangement of grooves, wherein said second socket section can be inserted axially into said first socket section and interlocked thereto at various rotational angles about a common axis by said ribs interfacing with said grooves to form an anti-rotation lock that prevents rotation of said first and second socket sections relative to one another, wherein the actuation element and the locking member are formed on a radially elastically deflectable tab that is connected to the second socket section, and further wherein the actuation element is movable in a circumferential direction of the second socket section between the latched position and the unlatched position.

2. The push-in connector of claim 1, wherein the second socket section and the first socket section are capable of being rotated about the common axis when the second socket section is inserted inside the first socket section.

3. The push-in connector of claim 2, wherein the locking member can be moved radially between the latched position and the unlatched position by the actuation element.

4. The push-in connector of claim 2, wherein the locking member is configured as an annular section, thereby enabling the latched position to be established at any rotational angular position between the push-in part and the second socket section.

5. The push-in connector of claim 2, wherein in the inserted condition, the push-in part protrudes into the socket part up to the first socket section further wherein a sealing element is disposed between the first socket section and the push-in part.

6. The push-in connector of claim 2, wherein the actuation element as well as the locking member are formed on a radially elastically deflectable tab that is connected to the second socket section, further wherein the actuation element is movable in a circumferential direction of the second socket section between the latched position and the unlatched position.

7. The push-in connector of claim 2, wherein the second socket section comprises a window, the window configured to allow a visual check of correct latching to be carried out.

8. The push-in connector of claim 1 wherein the locking member is movable radially between the latched position and the unlatched position by the actuation element.

9. The push-in connector of claim 8, wherein the locking member is configured as an annular section, thereby enabling the latched position to be established at any rotational angular position between the push-in part and the second socket section.

10. The push-in connector of claim 8, wherein in the inserted condition, the push-in part protrudes into the socket part up to the first socket section, further wherein a sealing element is disposed between the first socket section (3) and the push-in part.

11. The push-in connector of claim 8, wherein the actuation element as well as the locking member are formed on a radially elastically deflectable tab that is connected to the second socket section further wherein the actuation element is movable in a circumferential direction of the second socket section between the latched position and the unlatched position.

12. The push-in connector of claim 8, wherein the second socket section comprises a window, the window configured to allow a visual check of correct latching to be carried out.

13. The push-in connector of claim 1, wherein the locking member is configured as an annular section, thereby enabling the latched position to be established at any rotational angular position between the push-in part and the second socket section.

14. The push-in connector of claim 13, wherein in the inserted condition, the push-in part protrudes into the socket part up to the first socket section, further wherein a sealing element is disposed between the first socket section and the push-in part.

15. The push-in connector of claim 13, wherein the actuation element as well as the locking member are formed on a radially elastically deflectable tab that is connected to the second socket section further wherein the actuation element is movable in a circumferential direction of the second socket section between the latched position and the unlatched position.

16. The push-in connector of claim 13, wherein the second socket section comprises a window, the window configured to allow a visual check of correct latching to be carried out.

17. The push-in connector of claim 1, wherein in the inserted condition, the push-in part protrudes into the socket part up to the first socket section, and further wherein a sealing element is disposed between the first socket section (3) and the push-in part.

18. The push-in connector of claim 17, wherein the actuation element as well as the locking member are formed on a radially elastically deflectable tab that is connected to the second socket section further wherein the actuation element is movable in a circumferential direction of the second socket section between the latched position and the unlatched position.

19. The push-in connector of claim 1, wherein the second socket section comprises a window, the window configured to allow a visual check of correct latching to be carried out.

* * * * *